United States Patent [19]

Silvandersson

[11] Patent Number: 4,829,702
[45] Date of Patent: May 16, 1989

[54] INSECT TRAP

[76] Inventor: Åke Silvandersson, Pramvägen 13, S-310 20 Knäred, Sweden

[21] Appl. No.: 79,840
[22] PCT Filed: Nov. 5, 1986
[86] PCT No.: PCT/SE86/00504
  § 371 Date: Jul. 2, 1987
  § 102(e) Date: Jul. 2, 1987
[87] PCT Pub. No.: WO87/02863
  PCT Pub. Date: May 21, 1987

[30] Foreign Application Priority Data

Nov. 6, 1985 [SE] Sweden .................................. 8505220

[51] Int. Cl.$^4$ .............................................. A01M 1/14
[52] U.S. Cl. .......................................... 43/114; 43/116
[58] Field of Search ................................ 43/114, 116

[56] References Cited

U.S. PATENT DOCUMENTS

| | | | |
|---|---|---|---|
| 560,040 | 5/1896 | Maynadier | 43/114 |
| 693,536 | 2/1902 | Baker | 43/114 |
| 862,467 | 8/1907 | Gardiner | 43/114 |
| 2,258,683 | 10/1941 | Ketterer | 43/114 |
| 2,305,898 | 12/1942 | Richter et al. | 43/116 |
| 2,911,756 | 11/1959 | Geary | 43/114 |
| 4,031,654 | 6/1977 | Gray | 43/114 |

FOREIGN PATENT DOCUMENTS

| | | | |
|---|---|---|---|
| 2468305 | 5/1981 | France | 43/114 |
| 2058537 | 4/1981 | United Kingdom | 43/114 |

Primary Examiner—Nicholas P. Godici
Assistant Examiner—Karen Skillman
Attorney, Agent, or Firm—Balogh, Osann, Kramer, Dvorak, Genova & Traub

[57] ABSTRACT

An insect trap containing a frame provided with an insect-holding adhesive substance and capable of being placed in a desired position. The trap allows insects to be trapped effectively. The frame is transparent, at least to a certain degree, and exhibits a part which permits the installation of the trap in a desired position, for example, in a window on its glass.

6 Claims, 2 Drawing Sheets

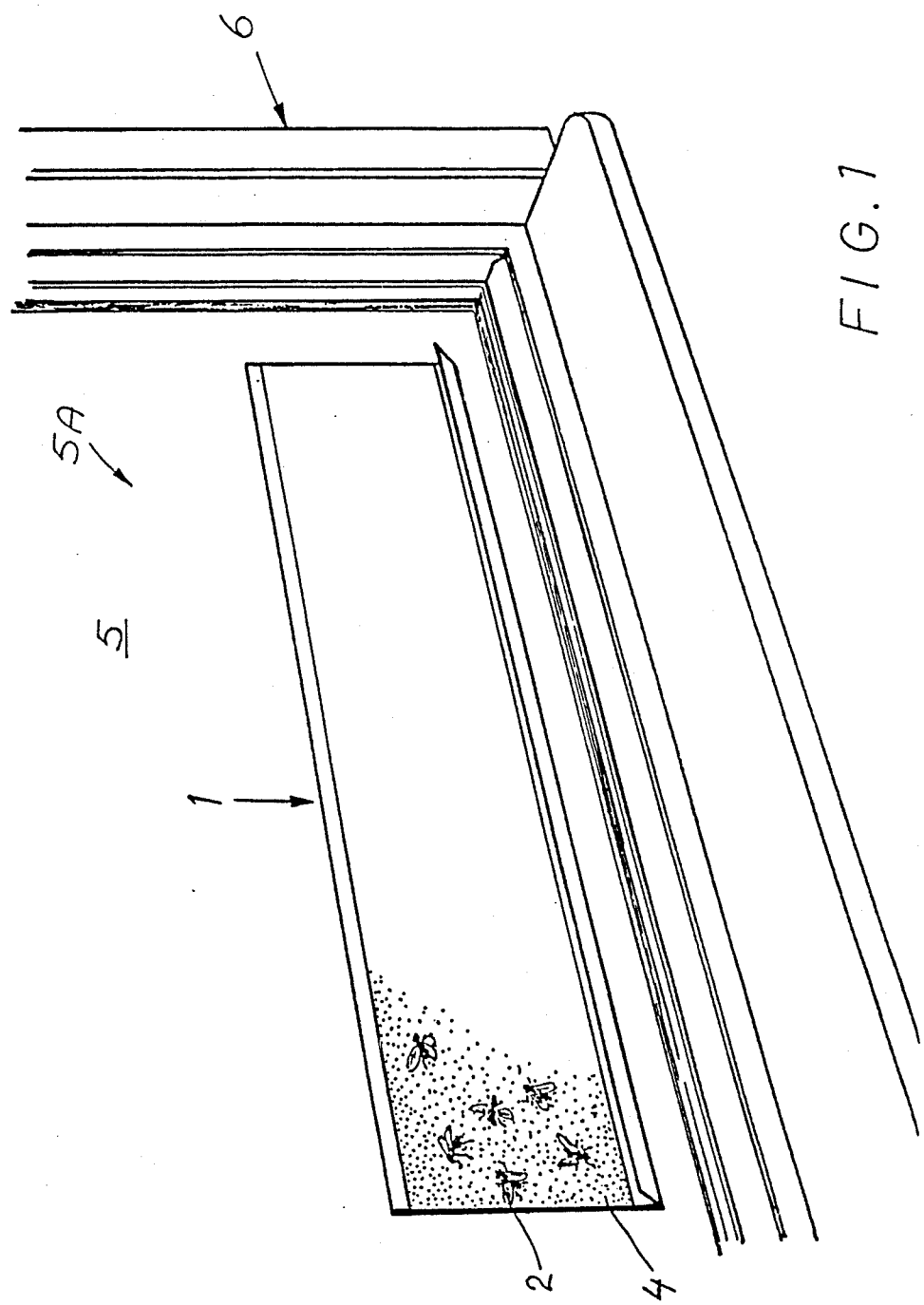

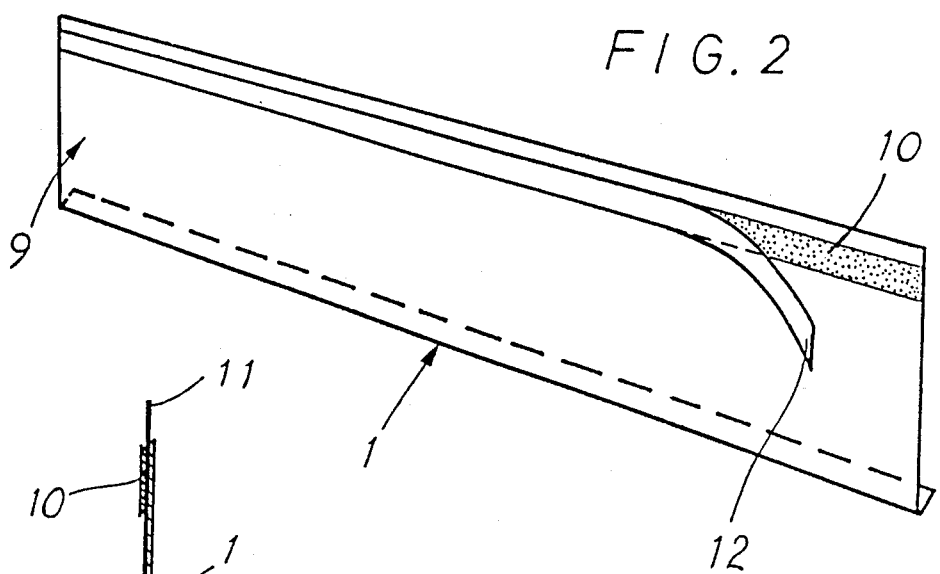
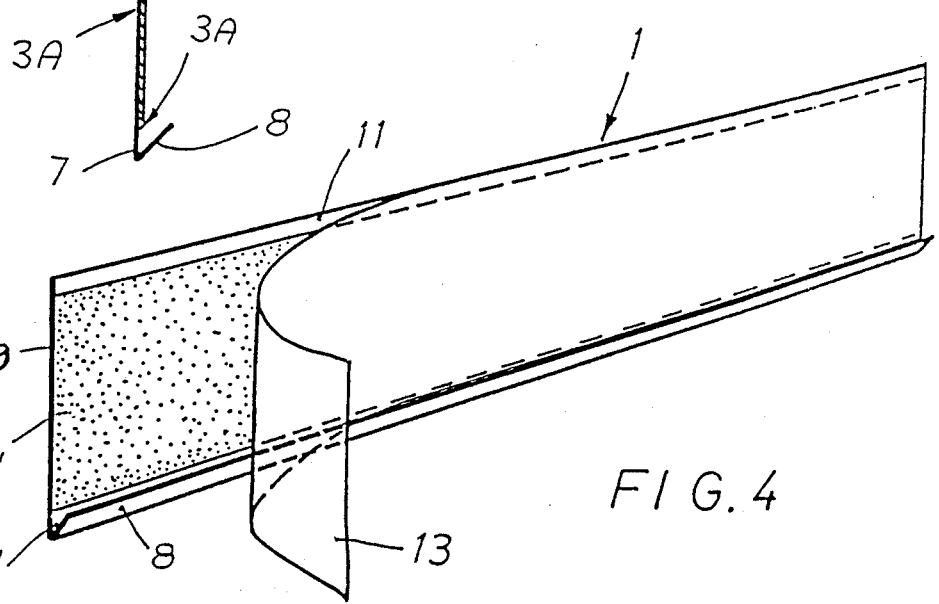

INSECT TRAP

The present invention relates to an insect trap containing a frame provided with an insect-holding adhesive substance and capable of being placed in a desired position.

The principal object of the present invention is to make available a trap of the kind indicated above which permits the effective catching of flies and other unpleasant insects which it is wished to keep out of homes and other specific areas.

A object is achieved by means of a trap in accordance with the present invention, which is characterized essentially in that the frame is transparent, at least to a certain degree, and exhibits a part which permits the installation of the trap in a desired position.

The invention is described below as a preferred illustrative embodiment, in conjunction with which reference is made to the drawings, in which:

FIG. 1 shows a perspective view of the trap in an application phase;

FIG. 2 shows the rear side of the trap;

FIG. 3 shows a section through the trap; and

FIG. 4 shows the front side of the trap.

A trap 1 arranged in accordance with the present invention for the purpose of catching and retaining undesired insects, such as flies 2, wasps and mosquitos, etc., contains a frame (3) which is made of a completely transparent or partially transparent appropriately slightly tinted material, such as a piece of plastic or a similar material. The piece of plastic 3 may consist of a strip or a sheet with some other suitable form.

The frame 3 is coated, for example on one of its sides 3A, with an adhesive substance 4 which permits the effective catching and retaining of the insects 2 in question which come into contact with said insect-holding adhesive substance 4. This adhesive substance 4 should be non-toxic and thus harmless to humans and pets, but should exhibit a good adhesive capacity to the insects 2.

For the purpose of being able, amongst other things, to catch any liquid adhesive substance 4 which may have been caused to melt from the frame 3, for example by the heat of the sun, and to prevent the messing and dirtying of the place in which the trap 1 is positioned, preferably the inside 5A of a glass pane 5 of a window 6 or some other covering element, the frame 3 exhibits a channel 8 or similar catchment component angled away from the lower edge part 7 of the frame. This channel 8 can be formed by the lower edge part 7 of the frame being folded upwards, as shown by way of example in FIG. 3.

The trap 1 also exhibits a part 9 which permits the trap 1 to be applied in the desired place, for example on a glass pane 5. This application part 9 can be formed by a strip of adhesive 10 or some other appropriate adhesive substance, which is capable of being attached to a surface 5A, and which, for example, extends along preferably the upper edge 11 of the frame on that side 3B of the frame 3 which is free of the insect-holding adhesive substance. This adhesive 10 should be of such a kind as is easily removed from undesired places, appropriately using water.

The insect traps 1 arranged in the form of strips are preferably covered by, for example, an easily removable siliconized protective layer 12 and 13 over the strip of adhesive 10 and the insect-holding adhesive substance 4, for the purpose of, amongst other things, preventing the unintentional sticking together of the traps 1 one to the other or to some other undesired object.

After removing the protective layer 12 from a trap 1, the trap 1 is then capable, thanks to the strip of adhesive 10, for example, of being attached easily to a pane of glass 5, for example. After removing the additional protective layer 13, the trap is ready to be used. Thanks to the fact that the frame 3 is transparent, at least to a certain degree, insects 2 will not notice that the trap 1 is attached to the window pane 5 or in some other suitable position, but will, as they fly into the pane 5 and the light outside the window or into the light behind the trap, become stuck to the adhesive substance 4. When the trap is considered to have served its purpose, it is easily pulled from the pane 5 and thrown away, to be replaced by a new trap 1.

The invention is not restricted to the illustrative embodiment described above and illustrated in the drawings, but may be varied within the scope of the Patent Claims without departing from the idea of invention.

I claim:

1. An insect trap comprising a substantially rectangular frame, an insect-holding adhesive substance on one side of said frame which is placed in a desired position, being transparent, at least to a certain degree, and a section on the opposite side of said frame, which section permits the installation of the trap in a desired position, said frame comprising a piece of plastic which exhibits a channel extending along the bottom longitudinal edge of said frame for catching insect-holding adhesive, said channel being angled away outwardly from its lower part, wherein the section is formed by an adhesive present on the side of the frame which is free of the insect-holding adhesive substance, wherein a strip of said adhesive extends along the upper edge of the frame, and wherein said strip of adhesive and the insect-holding adhesive substance are covered by a removable siliconized layer.

2. A trap according to claim 1, characterized in that the frame is in a single piece formed from plastic.

3. A trap according to claim 2, characterized in that the piece of plastic making up the frame includes a protective strip overlying a strip of adhesive positioned along one edge of said plastic.

4. An insect trap comprising a frame in the form of a substantially rectangular sheet provided with an insect-holding adhesive substance which permits catching and retaining insects which come into contact with the adhesive, on one of the sides of the sheet, and an application part of adhesive which permits the trap to be attached in the desired place to a surface, said application part of adhesive being on the side of the sheet which is free from insect-holding adhesive substance, characterized in that the sheet comprises a strip made of plastic material in a single piece, which plastic material, at least to a certain degree, is transparent and permits the insects to see light through the trap, and that the sheet is provided with a channel for catching the insect-holding adhesive, said channel extending along the bottom longitudinal edge of said frame and being angled away from the lower part of the sheet.

5. A trap according to claim 4, characterized in that the application part is formed by an adhesive present on the side which is free of the insect-holding adhesive substance.

6. A trap according to claim 5, characterized in that said adhesive extends along the upper edge of the frame, and in that said adhesive and the insect-holding adhesive substance are covered by a removable siliconized layer.

* * * * *